Patented Dec. 26, 1950

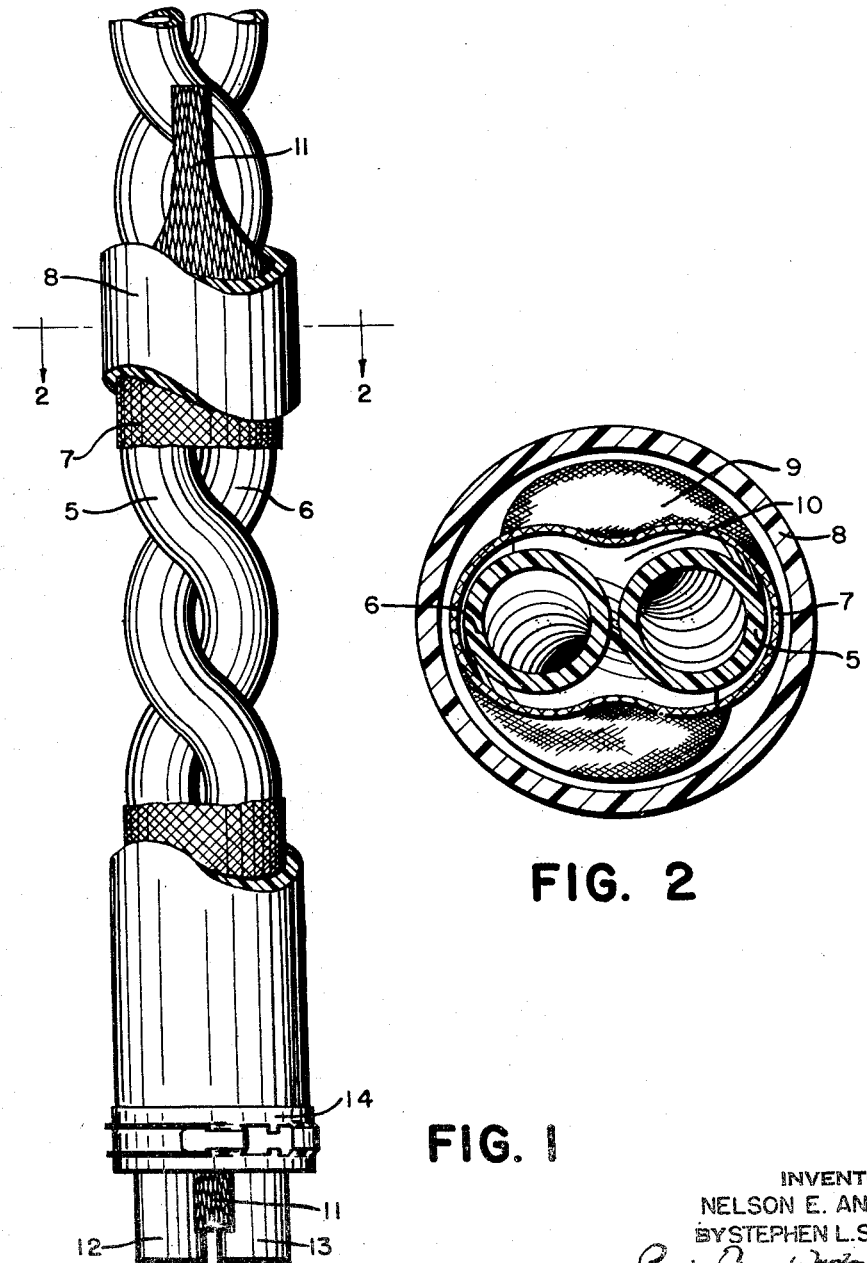

2,535,187

UNITED STATES PATENT OFFICE 2,535,187

LIQUID COOLED CABLE FOR WELDING EQUIPMENT

Nelson E. Anderson, Scotch Plains, and Stephen L. Sullivan, Red Bank, N. J., assignors to Air Reduction Company, Incorporated, New York, N. Y., a corporation of New York Application October 29, 1947, Serial No. 782,898

7 Claims. (Cl. 174—15)

This invention relates to electric cable for welding equipment and particularly to a cable having conduits for gas and water incorporated therein.

In the practice of electric welding, in which a blanket of an inert gas such as argon or helium is employed to shield the arc, it is necessary to deliver a heavy welding current (300 amperes more or less) to the electrode holder and also to supply the gas for shielding and water for cooling. Heretofore it has been customary to employ a heavy lead cable which is also relatively stiff. Such a cable introduces considerable resistance to movement of the electrode holder, and thus hampers the effort of the operator to manipulate the apparatus.

It is the object of the present invention to provide a light-weight and extremely flexible cable in which an electrical conductor and conduits for gas and water are included, so that manipulation of the electrode holder to which the cable is attached is relatively easy.

Other objects and advantages of the invention will be apparent as it is better understood by reference to the following specification and the accompanying drawing, in which Fig. 1 is a plan view partially in section of a piece of the cable; and Fig. 2 is a section on the line 2—2 of Fig. 1.

In accordance with the invention, two tubes, 5 and 6, are twisted about each other to form the core of the cable. These tubes provide the conduits for shielding gas and cooling water. The twisting of the tubes increases the flexibility of the cable in all directions.

The tubes 5 and 6 may be made of any light, flexible, impervious material. The most satisfactory materials are synthetic resins which are light in weight, pliable, non-conducting and durable. Numerous materials suitable for the purpose are available, such as rubber, neoprene, polystyrene, etc.

A layer of braided wire, preferably copper, similar to that customarily used in electrical shielding, is disposed about the tubes 5 and 6, extending longitudinally thereof. This braided wire forms a conductor 7 for the electric current. A casing 8 surrounds the braided wire. It is preferably made of the same material employed in the tubes 5 and 6, though other similar materials may be utilized. It affords a space 9 through which the cooling water supplied to the electrode holder (not shown) is returned. This water flows through the space 9 and in the space 10 beneath the braided wire 7, thus thoroughly cooling the conductor.

Because of the cooling effect of the returning water, it is possible to use the minimum weight of metal in the conductor 7 while carrying the full electrical load, i. e. 300 amperes more or less, employed in shielded arc welding. Thus, the weight of the cable is materially reduced, and the handling thereof is facilitated. For example, it has been found that a cable capable of supplying 300 amperes to the welding electrode in addition to the necessary shielding gas and cooling water, need be no larger than 5/8" outside diameter. The tubes 5 and 6 will be in suitable proportion to the diameter of the tube 8.

To connect the braided wire of the conductor 7 to the electrode holder, it is necessary merely to unbraid it for a distance and rebraid it as indicated at 11 to form an end which may be secured by a suitable connector (not shown). The ends 12 and 13 of the tubes 5 and 6 may be slipped over the corresponding nipples of the electrode holder and secured with cement or by means of clamps. A clamp 14 may be disposed about the adjacent end of the tube 8.

The cable as described is relatively light and very flexible. When connected to an electrode holder, it facilitates the handling thereof and avoids the difficulty inherent in the use of heavy lead connecting cables.

Various changes may be made in the form, arrangement and construction of the cable without departing from the invention or sacrificing any of the advantages thereof.

We claim:

1. A cable for electric welding equipment comprising a pair of flexible tubes twisted about each other longitudinally of the cable, a braid of conducting metal, and a casing of flexible material disposed about and enclosing the braid and twisted tubes and affording a space for cooling water.

2. A cable for electric welding equipment comprising a pair of flexible tubes of synthetic resin material twisted about each other longitudinally of the cable, a braid of conducting metal, and a casing of flexible material disposed about and enclosing the braid and twisted tubes and affording a space for cooling water.

3. A cable for electric welding equipment comprising a pair of flexible tubes twisted about each other longitudinally of the cable, a braid of conducting metal, and a casing of flexible synthetic resin material disposed about and enclosing the braid and twisted tubes and affording a space for cooling water.

4. A cable for electric welding equipment comprising a pair of flexible tubes twisted about each other longitudinally of the cable, a braid of conducting metal surrounding the tubes, and a casing of flexible material disposed about and enclosing the braid and twisted tubes and affording a space for cooling water.

5. A cable for electric welding equipment comprising a pair of flexible tubes of synthetic resin material twisted about each other longitudinally of the cable, a braid of conducting metal surrounding the tubes, and a casing of flexible material disposed about and enclosing the braid and twisted tubes and affording a space for cooling water.

6. A cable for electric welding equipment comprising a pair of flexible tubes twisted about each other longitudinally of the cable, a braid of conducting metal surrounding the tubes, and a casing of flexible synthetic resin material disposed about and enclosing the braid and twisted tubes and affording a space for cooling water.

7. A cable for electric welding equipment comprising a pair of flexible tubes extending longitudinally of the cable, a casing of flexible material disposed about and enclosing the tubes, at least portions of said casing being spaced from the tubes to provide a space extending longitudinally of the cable for the passage of a cooling fluid, and an electrically-conductive braid surrounding the tubes and extending longitudinally of the cable, said braid having parts thereof extending through said space and being spaced both from the cable and the casing so that a cooling medium passing through the space may pass freely through the interstices of the braid.

NELSON E. ANDERSON.
STEPHEN L. SULLIVAN.

REFERENCES CITED

The following references are of record in the file of this patent:

UNITED STATES PATENTS

| Number | Name | Date |
| --- | --- | --- |
| 2,108,759 | Turman | Feb. 15, 1938 |
| 2,139,888 | Fausek et al. | Dec. 13, 1938 |
| 2,234,435 | Johnson | Mar. 11, 1941 |
| 2,247,133 | Rees | June 24, 1941 |
| 2,277,177 | Wermine | Mar. 24, 1942 |
| 2,320,470 | Rees | June 1, 1943 |
| 2,433,588 | Wreford | Dec. 30, 1947 |